US010890272B1

(12) United States Patent
Allen et al.

(10) Patent No.: US 10,890,272 B1
(45) Date of Patent: Jan. 12, 2021

(54) U-SHAPED FAIRING WITH HINGED BLOCKS

(71) Applicant: VIV Solutions LLC, Richmond, TX (US)

(72) Inventors: Donald Wayne Allen, Richmond, TX (US); Dean Leroy Henning, Richmond, TX (US); Kathryn Marie Oujesky, Sugar Land, TX (US)

(73) Assignee: VIV Solutions LLC, Richmond, TX (US)

(*) Notice: Subject to any disclaimer, the term of this patent is extended or adjusted under 35 U.S.C. 154(b) by 0 days.

(21) Appl. No.: 17/006,718

(22) Filed: Aug. 28, 2020

Related U.S. Application Data

(60) Provisional application No. 62/893,817, filed on Aug. 30, 2019.

(51) Int. Cl.
*F16L 1/20* (2006.01)
*F16L 1/12* (2006.01)
*E21B 17/01* (2006.01)

(52) U.S. Cl.
CPC .............. *F16L 1/123* (2013.01); *E21B 17/01* (2013.01); *F16L 1/20* (2013.01)

(58) Field of Classification Search
CPC ........ E21B 17/01; F16L 1/123; B63B 21/663; B63B 2021/504
See application file for complete search history.

(56) References Cited

U.S. PATENT DOCUMENTS

| 3,209,718 A | | 10/1965 | Rather et al. | |
| 3,611,976 A | * | 10/1971 | Hale | B63B 21/663 |
| | | | | 114/243 |
| 3,859,949 A | * | 1/1975 | Toussaint | B63B 21/663 |
| | | | | 114/243 |

(Continued)

FOREIGN PATENT DOCUMENTS

| EP | 0096956 B1 | 12/1983 |
| WO | WO2014166543 A1 | 10/2014 |
| WO | WO2016080828 A2 | 5/2016 |

OTHER PUBLICATIONS

Allen, et al., "Comparisons of Various Fairing Geometries for Vortex Suppression at High Reynolds Numbers", OTC 19377, 2008 Offshore Technology Conference, Houston, Texas, (May 5-8, 2008), 16 pages.

*Primary Examiner* — Benjamin F Fiorello
(74) *Attorney, Agent, or Firm* — Womble Bond Dickinson (US) LLP

(57) ABSTRACT

A vortex-induced vibration (VIV) suppression device comprising: a fairing comprising a fairing body dimensioned to partially encircle an underlying tubular and a first arm and a second arm extending from the fairing body, the fairing body comprises a first section and a second section that each have first ends that are interfacing one another to form a gap in between and a second end, and the first arm and the second arm are attached to the second ends such that they extend radially outward from the underlying tubular, and the first arm and the second arm are spaced a distance from one another; and an interior block member to facilitate an opening or a closing of the fairing body around an underlying tubular, the interior block member having a first block section and a second block section movably coupled to one another.

20 Claims, 6 Drawing Sheets

(56) References Cited

U.S. PATENT DOCUMENTS

| | | |
|---|---|---|
| 4,075,967 A | 2/1978 | Silvey |
| 4,398,487 A | 8/1983 | Ortloff et al. |
| 4,474,129 A | 10/1984 | Watkins et al. |
| 5,456,199 A | 10/1995 | Kernkamp |
| 5,738,034 A | 4/1998 | Wolff et al. |
| 5,984,584 A | 11/1999 | McMillan et al. |
| 6,010,278 A | 1/2000 | Denison |
| 6,048,136 A * | 4/2000 | Denison ............. B63B 21/502 114/243 |
| 6,067,922 A | 5/2000 | Denison et al. |
| 6,347,911 B1 * | 2/2002 | Blair ................. E01D 19/02 24/462 |
| 6,517,289 B1 | 2/2003 | Coakley et al. |
| 7,070,361 B2 | 7/2006 | McMillan et al. |
| 7,337,742 B1 | 3/2008 | Masters et al. |
| 7,513,209 B2 | 4/2009 | Masters et al. |
| 8,834,070 B2 | 9/2014 | Masters |
| 9,523,456 B1 * | 12/2016 | Allen ................. F16L 1/123 |
| 9,534,618 B1 * | 1/2017 | Allen ............... E21B 41/0007 |
| 9,677,688 B1 | 6/2017 | Allen et al. |
| 9,702,482 B1 | 7/2017 | Allen et al. |
| 9,725,961 B2 | 8/2017 | Skaugset |
| 10,274,107 B2 | 4/2019 | Skaugset |
| 10,344,785 B1 * | 7/2019 | Allen ................. F15D 1/003 |
| RE48,123 E * | 7/2020 | Masters ............. F16L 57/00 |
| 2002/0134553 A1 | 9/2002 | Woodrow |
| 2005/0254903 A1 | 11/2005 | McMillan |
| 2006/0021560 A1 | 2/2006 | McMillan |
| 2007/0104542 A1 | 5/2007 | Somerville |
| 2007/0215028 A1 | 9/2007 | Lie |
| 2007/0231077 A1 * | 10/2007 | Burgess ............. F16L 1/123 405/216 |
| 2008/0025800 A1 * | 1/2008 | Watkins ............. B63B 21/502 405/216 |
| 2010/0119308 A1 * | 5/2010 | Somerville ......... B63B 21/502 405/216 |
| 2012/0168019 A1 | 7/2012 | Allen |
| 2012/0243944 A1 | 9/2012 | Masters |
| 2012/0291687 A1 * | 11/2012 | Dehne ............... F16L 1/123 114/271 |
| 2018/0135666 A1 * | 5/2018 | Van Belkom ...... E21B 17/01 |

* cited by examiner

U-SHAPED FAIRING WITH HINGED BLOCKS

CROSS-REFERENCE TO RELATED APPLICATION

The application is a non-provisional application of U.S. Provisional Patent Application No. 62/893,817, filed Aug. 30, 2019, which is incorporated herein by reference in its entirety.

FIELD

A fairing with hinged blocks, for example, a U-shaped fairing with hinged blocks. Other embodiments are also described herein.

BACKGROUND

A difficult obstacle associated with the exploration and production of oil and gas is management of significant ocean currents. These currents can produce vortex-induced vibration (VIV) and/or large deflections of tubulars associated with drilling and production. VIV can cause substantial fatigue damage to the tubular or cause suspension of drilling due to increased deflections. Both helical strakes and fairings can provide sufficient VIV suppression, but can be difficult to install on a tubular underwater.

Fairings have an advantage over helical strakes in that they can have much lower drag. There are various shapes of fairings that have been tested or utilized and the performance of the fairing is strongly dependent upon the fairing shape or geometry.

Installation time for fairings is another important criterion that varies with fairing design. It is important for a fairing to be fast to install. This is especially important for drilling riser fairings where the fairings tend to be large and more difficult to handle.

Another important parameter is the storage space the fairings require. Most fairings take up a substantial amount of storage space and, since most fairings are transported in shipping containers that are often very expensive, having a fairing design that is stored efficiently can be of great value.

SUMMARY

The present invention consists of a U-shaped type fairing that is fast to install and strong using a hinged block system for structural support. In one aspect, the outside shape of the fairing resembles the letter "U" or a similar shape that can at least partially encircle, and extend outward from, the underlying tubular. The "U" shaped fairing is robust in performance in that its geometry does not need to be exact in order for it to provide relatively good VIV suppression and drag reduction performance. For example, VIV suppression and drag reduction performance can be achieved when the sides extending outward from the underlying tubular are parallel as well as if the sides taper (e.g., the sides taper inwardly toward one another). The length of the sides can also vary, and flanges may, or may not, be located at the ends of the fairings. These flanges may be internal or external to the fairing body.

The "U" shaped fairing may further be designed so that it is relatively lightweight and inexpensive, while still maintaining good structural strength. In the case of a "U" shaped fairing, the configuration of the side walls may make them difficult to support along with the strong forces that these walls experience. The instant invention proposes a "U" shaped fairing configuration in which this challenge is overcome. In addition, the "U" shaped is configured so that it is fast to install, efficient to store, relatively lightweight, relatively strong and/or relatively inexpensive.

In one aspect, a vortex-induced vibration (VIV) suppression device includes a fairing comprising a fairing body dimensioned to partially encircle an underlying tubular and a first arm and a second arm extending from the fairing body, wherein the fairing body comprises a first section and a second section that each have first ends that are interfacing one another to form a gap in between and a second end, and the first arm and the second arm are attached to the second end of a respective one of the first section and the second section such that they extend radially outward from the underlying tubular, and the first arm and the second arm are spaced a distance from one another along their entire length; and an interior block member to facilitate an opening or a closing of the fairing body around an underlying tubular, the interior block member having a first block section coupled to the first arm, a second block section coupled to the second arm and wherein the first block section and the second block section is movably coupled to the first block section. In some aspects, the distance between the first arm and the second arm decreases in a direction radially outward from the underlying tubular. In another aspect, the interior block member allows for ends of the first arm and the second arm to be moved toward one another to open the gap and away from one another to close the gap around the underlying tubular. The first block section and the second block section may include outer ends that are coupled to the first arm and the second arm, respectively, and inner ends having interfacing recessed regions that are coupled to one another by a hinge. The first block section or the second block section may include an opening to allow for water to flow through the first block section or the second block section. In addition, the interior block member may be a first interior block member and the device may further include a second interior block member coupled to the first arm and the second arm. In some aspects, a nose member may be positioned along the gap to connect the first ends of the first section and the second section around the underlying tubular. The nose member may include a fastener to connect the first section and the second section. In some cases, at least one of the first ends may include an alignment notch that facilitates alignment of the fastener of the nose member with a fastener opening formed in the first section or the second section. A flange may extend radially inward from the fairing body or the interior block member. The flange may include a base portion that is attached to the fairing body or the interior block member and a lip portion that is perpendicular to the base portion. The first arm and the second arm may be non-parallel to one another. For example, the first arm and the second arm may taper toward one another as they extend radially outward from the underlying tubular. In some aspects, the gap may be a longitudinal opening extending along at least a portion of an axis of the fairing body, and the opening may be modifiable between an open configuration and a closed configuration. In some aspects, a handle may be coupled to at least one of the first section or the second section near the gap.

In another embodiment, a fairing is disclosed including a first section having a first body portion dimensioned to partially encircle an underlying tubular and a first arm portion extending radially outward from the first body portion; a second section having a second body portion dimensioned to partially encircle an underlying tubular and a second arm portion extending radially outward from the second body portion, and wherein a longitudinal opening is formed between an end of the first body portion and an end of the second body portion and the first arm and the second arm taper toward one another; a connecting member dimensioned to extend along the longitudinal opening and configured to connect the ends of the first body portion and the second body portion; and an interior block dimensioned to extend between the first arm and the second arm and configured to movably connect the first arm and the second arm. In some aspects, the first body portion and the second body portion have a curved shape that conforms to the shape of the underlying tubular, and the first arm and the second arm are straight. In still further aspects, the first body portion and the first arm may be integrally formed with one another as a single piece and the second body portion and the second arm are integrally formed with one another as a single piece. The connecting member may have a width greater than the longitudinal opening so that the ends of the first body portion and the second body portion overlap the connecting member, and further comprises at least one fastener to connect the connecting member to at least one of the overlapping ends. In some aspects, the interior block is a first interior block comprising a hinge that allows the first arm and the second arm to move relative to one another, and the fairing further comprises a second interior block positioned between the first arm and the second arm at a position above or below the first interior block.

The above summary does not include an exhaustive list of all aspects of the present invention. It is contemplated that the invention includes all apparatuses that can be practiced from all suitable combinations of the various aspects summarized above, as well as those disclosed in the Detailed Description below and particularly pointed out in the claims filed with the application. Such combinations have advantages not specifically recited in the above summary.

BRIEF DESCRIPTION OF THE DRAWINGS

The embodiments disclosed herein are illustrated by way of example and not by way of limitation in the FIGURES of the accompanying drawings in which like references indicate similar elements. It should be noted that references to "an" or "one" embodiment in this disclosure are not necessarily to the same embodiment, and they mean at least one.

DETAILED DESCRIPTION

In this section we shall explain several preferred embodiments with reference to the appended drawings. Whenever the shapes, relative positions and other aspects of the parts described in the embodiments are not clearly defined, the scope of the embodiments is not limited only to the parts shown, which are meant merely for the purpose of illustration. Also, while numerous details are set forth, it is understood that some embodiments may be practiced without these details. In other instances, well-known structures and techniques have not been shown in detail so as not to obscure the understanding of this description.

Figure 1A:
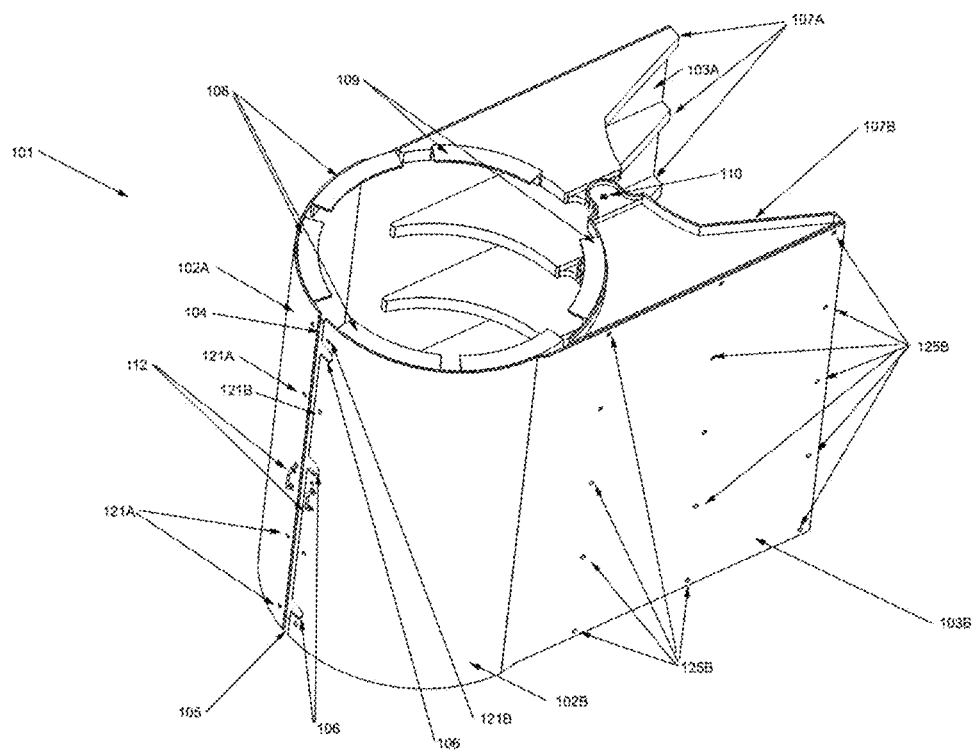
FIG. 1A is a perspective view of a nose-opening U-shaped fairing with hinged blocks and other optional features.

Referring now to the invention in more detail, FIG. 1A shows fairing 101 having a first section or half 102A and a second section or half 102B. Half 102A has side wall 103A while half 102B has side wall 103B. In some aspects, the side walls 103A-B are separate pieces that are each attached at one end to an end of the curved portions of section or half 102A-B that encircle the underlying tubular. In other aspects, the side walls 103A-B are integrally formed as a single piece with the curved portions of section or half 102A-B. For example, half 102A and side wall 103A is one integrally formed continuous piece and the half 102B and side wall 103B is one integrally formed continuous piece.

In some aspects, the other end of each of the curved portions of sections or halves 102A-B (e.g., the end not connected to side walls 103A-B) may form a gap or seam 105. The gap or seam 105 may be formed by interfacing ends of the halves 102A-B that run in a direction parallel to a length dimension or longitudinal axis of the underlying tubular. In this aspect, the gap or seam 105 may be also be described as a longitudinal opening or channel, or running in a direction substantially parallel to the longitudinal axis of the tubular. In addition, fairing 101 may include a nose piece 104 which bridges the gap or seam 105 between the two halves 102A, 102B and connects them together. For example, nose piece 104 may have a width that is wider than gap or seam 105 between the edges of halves 102A-B such that it overlaps the edges, and the edges of halves 102A-B may be attached to the portions of the nose piece 104 that they overlap. Nose piece 104 may, however, be optional. At least one of the halves 102A-B may further include notches 106 formed along the edge of the section or half that defines the gap or seam 105. In the illustrated configuration, notches are shown present on half 102B. In addition, at least one of halves 102A-B may include fastener locations 121B also along the edges of the section or half that defines the gap or seam 105. In the illustrated configuration, fastener locations 121A are located on half 102A. Handles 112 may further be located on one or both of sections or halves 102A-B. In the illustrated configuration, handles 112 are positioned near the edges of both sections or halves 102A-B defining the gap or seam 105. Optional internal nose flanges 108 and block flanges 109 may be located at each end of the fairing (the top is shown and the bottom is hidden). Block halves 107A and 107B are joined at hinge 110. Side wall fastener locations 125B are shown on side wall 103B.

Again referring to FIG. 1A, nose piece 104 may be attached to one of the sections or halves 102A-B (e.g. half 102A at fastener locations 121A) and then the fairing is opened by pushing open the nose or pushing in on the rear of side walls 103A and 103B. Next the fairing is placed around an underlying tubular and then closed around that tubular and secured by fasteners connecting walls 103A-B to, for example a nose piece 104, at fastener locations 121B. Notches 106 are optional and may be used with marked locations on nose piece 104 to align the pieces with one another. Handles 112 may be used to assist in maneuvering each half 102A and 102B to align nose piece 104 with underlying fasteners or other attachment hardware.

Optional internal flanges 108 may extend radially inward from the portions of device 101 surrounding the underlying tubular, toward the tubular. Internal flanges 108 may include a number of flange sections that are configured to, in combination, partially encircle the underlying tubular and may have a gap in them so that the nose area may be more easily opened for securing the nose piece to both sides of fairing 101. Block flanges 109 may be used to centralize fairing 101 around an underlying tubular or to interface with other features of the underlying tubular such as grooves that mate with internal flanges 108 or block flanges 109. Block halves 107A and 107B may be joined at hinge locations 110 and aligned so that seam 105 may be easily opened for installation of fairing 101. Block halves 107A and 107B may also provide a strong structural support to side walls 103A and 103B by attaching the blocks at fastener locations 125B (and 103A, which are hidden by block halves 107A in FIG. 1A).

Still referring to FIG. 1A, block halves 107A and 107B may be of any suitable shape and may be recessed as shown in FIG. 1A or may be solid or have any other suitable thickness. In other aspects, block halves 107A and 107B may not be solid pieces and instead have holes or openings formed through them. Block halves 107A and 107B may be attached to the interior surfaces of the side walls 107A-B (surfaces that face one another) and be considered running horizontally across the gap between side walls 107A-B. Block halves 107A-B may extend to the ends of side walls 103A and 103B or may extend only part way along side walls 103A and 103B. Block halves 107A and 107B may be of any suitable thickness and may be attached to side walls 103A and 103B using any suitable means including, but not limited to, bolts, screws, nuts, washers, rivets, welding, chemical bonding, latching, or pinning. Any suitable number of blocks or block halves 107A and 107B may be used. Block halves 107A and 107B may each consist of a single piece or may be made of multiple pieces that are attached to each other or to side walls 103A and 103B by any suitable means. Hinge 110 may be of any suitable size and shape and any suitable hinge may be used including, but not limited to, bolts, butt hinges, spring hinges, piano hinges, pivot hinges, flash hinges, barrel hinges, butterfly hinges, gate hinges, bi-fold hinges, and knife hinges. Internal flanges 108 and block flanges 109 may be of any suitable shape including, but not limited to, L-shaped (such as an L-bracket), U-shaped, rectangular (solid or hollow), or molded in shapes. Internal flanges 108 and block flanges 109 may be of any length around the circumference of fairing 101 and may consist of a single segment or multiple segments such as that shown in FIG. 1A. Internal flanges 108 and 109 may extend towards the interior of fairing 101 such as shown in FIG. 1A or may extend outward towards the exterior of fairing 101. Such flange extensions may be of any suitable depth towards, or away from, fairing 101. Any number of internal flanges 108 and block flanges 109 may be used or they may not be used at all. Internal flanges 108 may be integral to halves 102A-B or side walls 103A-B or may be separate from halves 102A-B or side walls 103A-B. Similarly, block flanges 109 may be integral with block halves 107A and 107B or may be separate from block halves 107A and 107B. Nose piece 104 may be of any suitable size or shape including any thickness, width, or length. Nose piece 104 may include a single piece or may include multiple pieces that may, or may not, be attached to each other. Nose piece 104 may be attached to fairing 101 or fairing half 102A and fairing half 102B by any suitable means including, but not limited to, bolts, screws, nuts, washers, rivets, pins (including serrated pins), latching, welding, chemical bonding, or clamping. Nose piece 104 may be pre-attached to one side of seam 105 prior to installation around a tubular but this is not required. Any number of fastener locations 121A and 121B may be present and fastener locations may be of any suitable shape such as round, elliptical (e.g. slots), etc.

In addition, any number of notches 106 may be present on fairing 101. Notches 106 may be located near seam 105 but they need not extend all the way to seam 105 as shown in FIG. 1A. Notches 106 may be of any suitable shape or size. Nose piece 104 may have fasteners, pins, marks, or other means for utilising notches 106 to align half 102A and half 102B. Nose piece 104 may be internal to fairing 101 or external to 101 or nose pieces may be used both internal and external to fairing 101 with the nose pieces of similar, or different, size and shape. Notches 106 may, however, be optional.

Fairing 101 may further include any number of handles 112. Handles 112 may be of any type, size, or shape and are merely representative of one or more appurtenances that may be used to help maneuver half 102A, half 102B or fairing 101 into a desired location or configuration. Handles 112 may be attached to fairing 101 by any suitable means. Although handles 112 are described and shown in FIG. 1A, handles 112 are optional and may be omitted in some embodiments.

Seam 105 may run the height of fairing 101 but may be of any suitable width. In other aspects, seam 105 and nose piece 104 may be omitted, and instead the ends of half 102A and 102B may overlap and be attached to each other through any suitable means including, but not limited to, bolts, screws, nuts, washers, rivets, welding, chemical bonding, latching, or pinning. Half 102A and side 103A may be a single piece or may be made of more than one piece. Similarly, half 102B and side 103B may be a single piece or may consist of more than one piece. This feature is also relevant to each of half 102A, half 102B, side 103A, and side 103B in that each component may be made of one piece or made of multiple pieces. These pieces may, or may not, be attached to each other.

Still referring to FIG. 1A, half 102A, half 102B, side walls 103A and 103B, nose piece 104, handles 112, internal flanges 108, block flanges 109, block halves 107A and 107B, and/or any other component of fairing 101 may be made of any suitable material including, but not limited to, plastic, metal, fiberglass, composite, wood, ceramic, or synthetic. Each component may be made of the same material or each component may be made of a different material than one or more of the other components. Each component may also be made of more than one material.

Figure 1B:
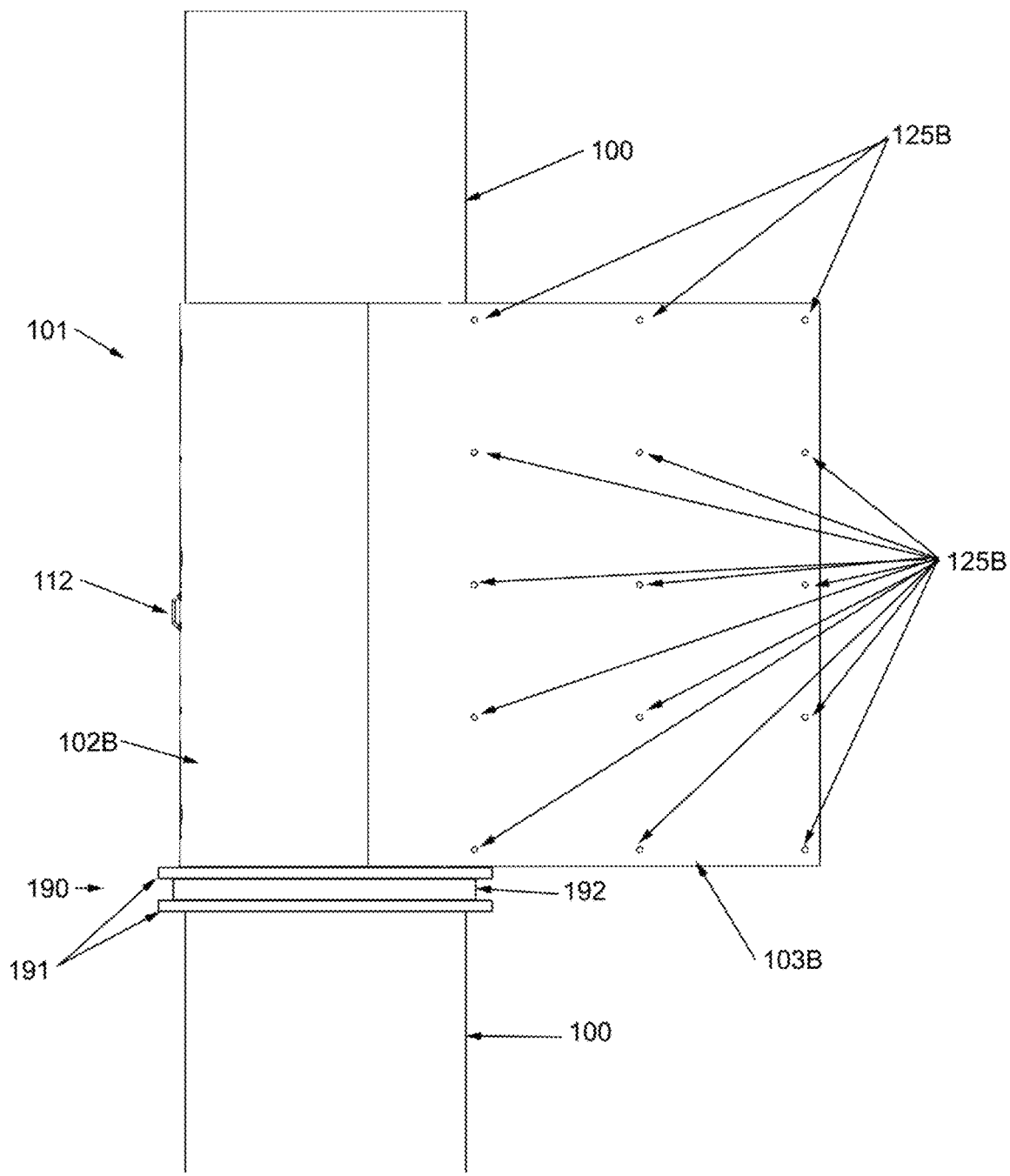
FIG. 1B is a side view of a U-shaped fairing supported by a collar.

Referring now to FIG. 1B, fairing 101 is shown around tubular 100 and sitting on collar 190. FIG. 1B is a side view showing half 102B and side wall 103B. Side 103B may be attached to internal block halves (not shown) at fastener locations 125B. Optional handle 112 is further shown attached to fairing 101. Collar 190 may have optional flanges 191 extending radially outward from the top and bottom edges of web 192.

Again referring to FIG. 1B, collar 190 is clamped tight against tubular 100. Collar 190 may include one or more circumferential or axial segments and may be clamped to tubular 100 by any suitable means including, but not limited to, bolting, banding chemical bonding, or welding. Collar 190 may have any number of flanges 191 or in some embodiments, flanges 191 may be omitted.

Still referring to FIG. 1B, collar 190, fairing 101, flanges 191, web 192, and tubular 100 may be of any suitable size, shape, or quantity. For example, more than one fairing 101 may be present, more than one collar 190 may be present, and in fact in most applications multiple fairings 101 and collars 190 may be present. It is also possible for more than one tubular 100 to be present and for fairing 101 to be around a single tubular 100 or multiple tubulars 100. Collar 190 may be replaced by clamps of other geometries. The only important criterion is that the collar be clamped sufficiently tight against tubular 100 to support fairing 101. Fairing 101 may be positively or negatively buoyant so that a collar may be needed above fairing 101, below fairing 101, or both.

Still referring to FIG. 1B, collar 190, web 191, flanges 191, and tubular 100 may be made of any suitable material including, but not limited to, plastic, metal, fiberglass, composite, wood, ceramic, or synthetic. Each component may be made of the same material or each component may be made of a different material than one or more of the other components. Each component may also be made of more than one material.

Figure 1C:
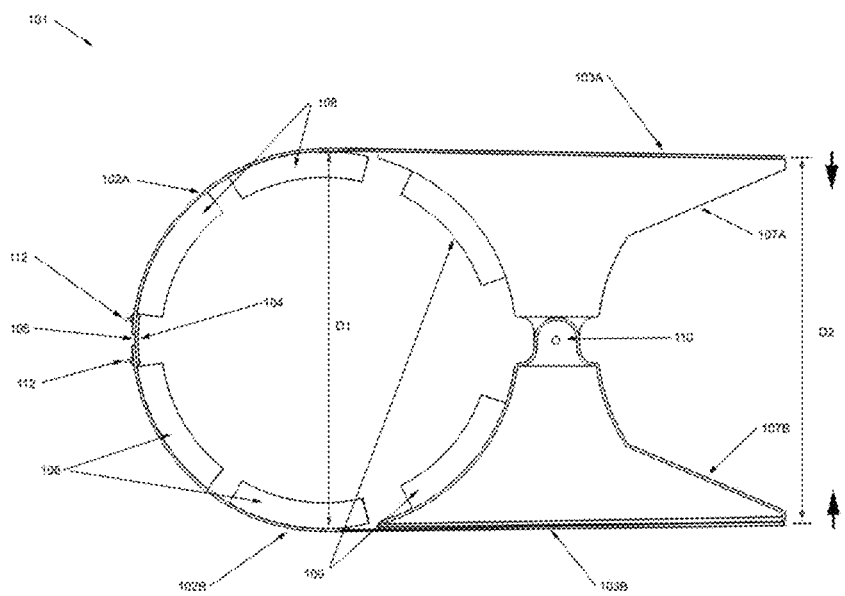
FIG. 1C is a top view of a U-shaped fairing with internal flanges.

Referring now to FIG. 1C, fairing 101 is shown with half 102A coupled to side 103A, and half 102B coupled to side 103B. Also shown are optional nose piece 104, seam 105, optional handles 112, optional internal flanges 108 and block flanges 109, block halves 107A and 107B, and hinge location 110.

Again referring to FIG. 1C, this FIGURE is a top view of fairing 101 and illustrates how fairing 101 is opened at seam 105 by either opening fairing 101 at the nose location or by pushing the back sides of fairing 101 together as shown. Optional internal flanges 108 and block flanges 109 may be used in lieu of, or in conjunction with, a collar if such flanges can be inserted into grooves in fairing 101 such as circumferential grooves in buoyancy or in insulation. For example, when a buoyancy member is positioned around the tubular, it may have grooves that can receive the one or more of internal flanges 108 and/or block flanges 109 to hold the fairing at the desired axial position. In this aspect, an additional collar to hold the fairing in the desired axial position is not necessary. One or more internal flanges 108 may be present without any block flanges 109 present and vice versa. Internal flanges 108 and block flanges 109 may be located at any location on fairing 101. For example, internal flanges 108 and block flanges 109 may be located at both the top and bottom of fairing 101. Side walls 103A and 103B may be parallel or tapered towards each other and may be of any suitable length, height, or thickness. Representatively, in some aspects, side walls 103A, 103B may taper toward one another such that they are at a first distance from one another near the nose (i.e., distance D1) and a second distance from one another near the ends (i.e., distance D2). For example, distance D1 may be greater than distance D2 such that the side walls 103A, 103B may be closer together at their ends than they are near the nose.

Figure 1D:
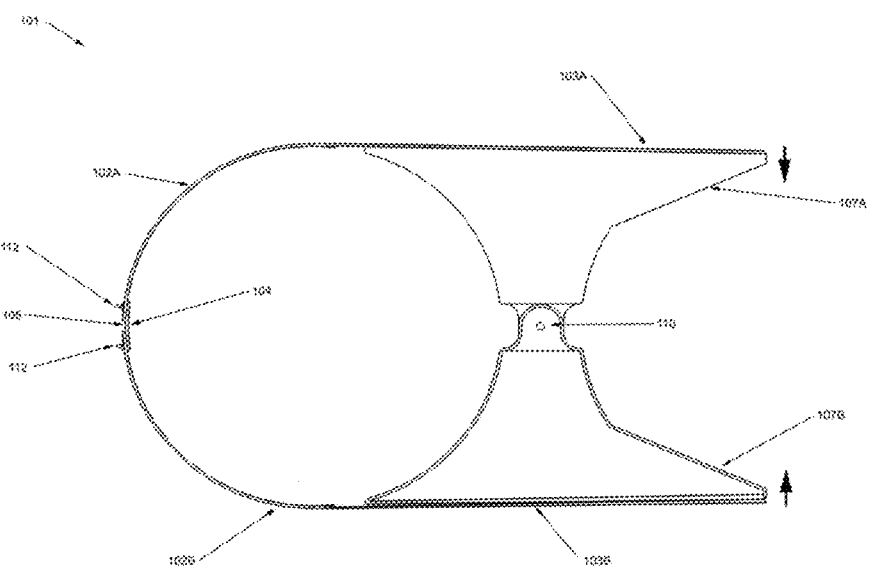
FIG. 1D is a top view of a U-shaped fairing without internal flanges.

Referring now to FIG. 1D, fairing 101 is shown with half 102A which has side 103A, and half 102B which has side 103B. Also shown are optional nose piece 104, seam 105, optional handles 112, block halves 107A and 107B, and hinge location 110.

Again referring to FIG. 1D, this FIGURE illustrates that any flanges are optional and thus this FIGURE shows the top view of a fairing without flanges.

Figure 1E:
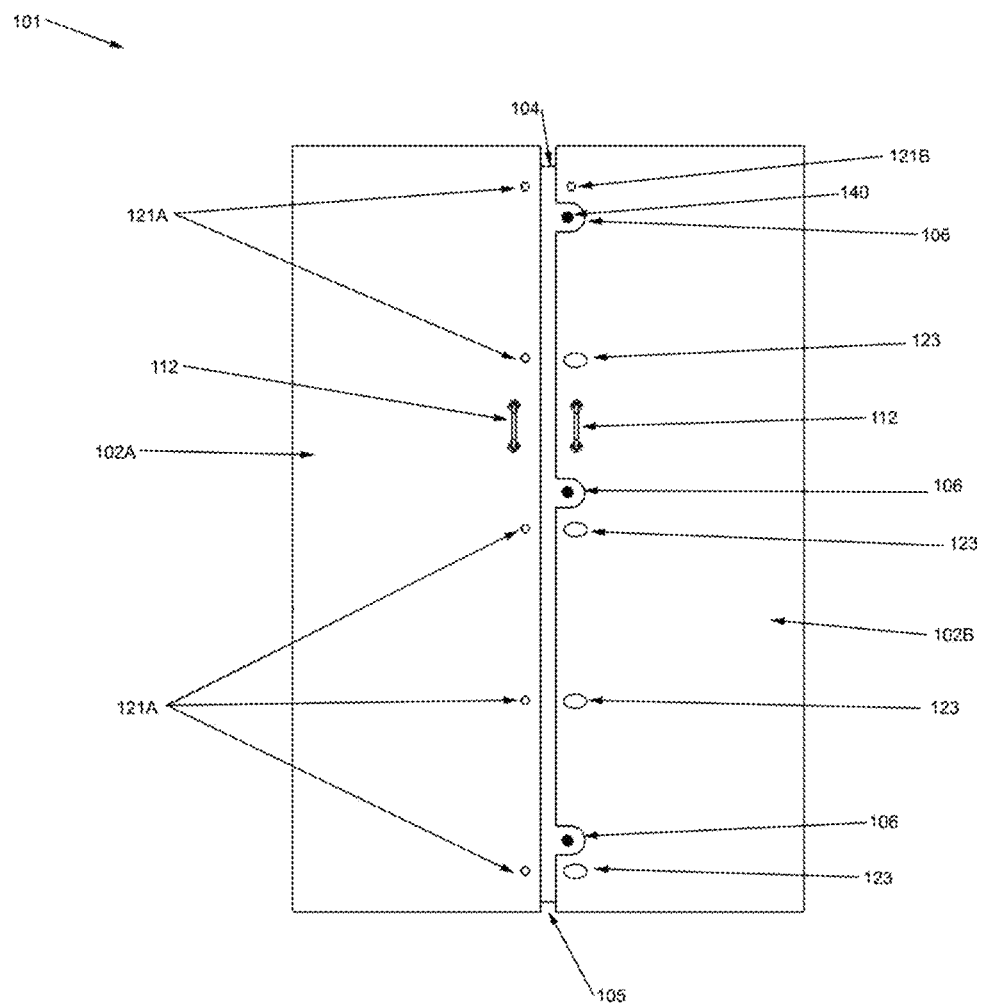
FIG. 1E is a front view of a U-shaped fairing that opens at the nose.

Referring now to FIG. 1E, this FIGURE is a front view of fairing 101 and shows more clearly half 102A, half 102B, seam 105, nose piece 104, notches 106, fastener locations 121A and 121B, and slots 123.

Again referring to FIG. 1E, this FIGURE illustrates how slots or notches 106 may be used on one or more sides of seam 105 and may align with bolts 140 in order to make it easier to locate and align any underlying fasteners (e.g. bolts) on half 102A or half 102B with the fastener locations 121A-B and/or slots 123. For example, this facilitates the insertion of the nose fasteners into half 102A or 102B. Slots 123 may be of any suitable size or shape.

Figure 1F:
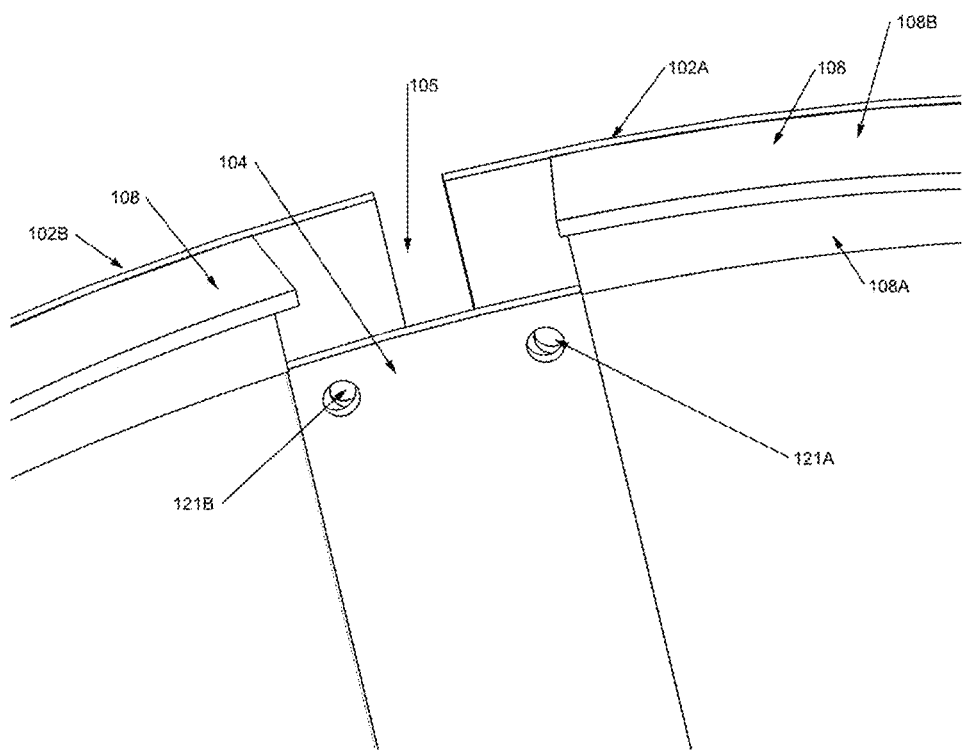
FIG. 1F is a close-up view of a nose support plate.

Referring now to FIG. 1F, this FIGURE is a close-up of nose piece 104 and internal flanges 108 and how they interface with half 102A, half 102B, and seam 105 using fastener locations 121A and 121B.

Again referring to FIG. 1F, in this case nose piece 104 is simply fastened to half 102A and half 102B. Typically, bolts may be pre-attached to nose piece 104 at both fastener locations 121A and 121B using a thin nut on the outside of nose piece 104 or by threading the bolts through nose piece 104. This optional thin nut would reside between nose piece 104 and halves 102A and 102B. Next, one side of nose piece 104 would be pre-attached to either half 102A or half 102B and then opened and placed around the underlying tubular. Finally, the side that was not pre-attached to half 102A or half 102B is fastened after both halves 102A and 102B are closed around the underlying tubular. This secures the fairing around the underlying tubular. It can further be seen from this view that internal flange 108 may be an L shaped structure having a base portion 108A that attaches to one of the halves 102A-B and a lip portion 108B that is perpendicular to the base portion 108A and extends radially outward from the halves 102A-B.

Figure 1G:
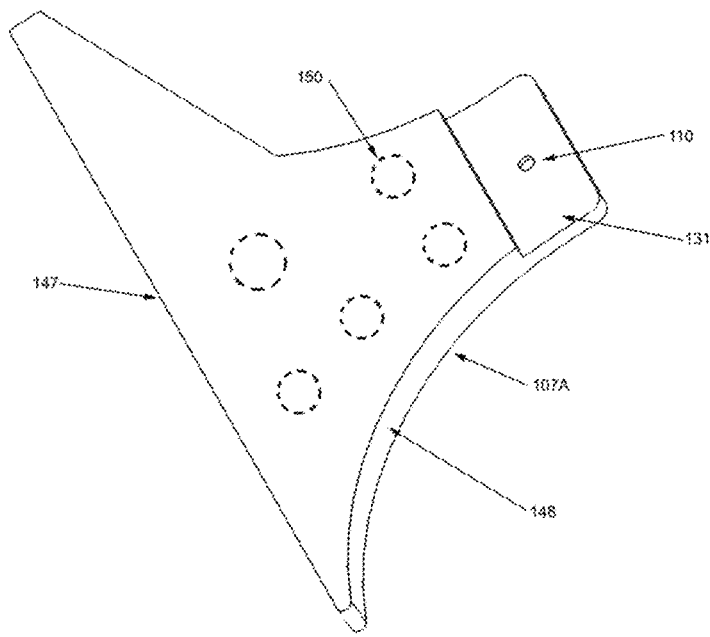
FIG. 1G is a perspective view of one-half of a hinged block.

Referring now to FIG. 1G, block half 107A is shown along with hinge location 110. Block face 147 is attached to the fairing side wall (in this case side wall 103A as shown above) and tubular face 148 faces the underlying tubular. Step 131 allows the two block halves to interface and maintain the same thickness at the hinge location as both block halves. Again referring to FIG. 1G, step 131 is optional and there are other configurations that may be used to interface two block halves with each other. Step 131 may be of any size or shape and may be of any suitable thickness. Step 131 may have a geometry to accommodate any suitable hinge. In addition, block half 107A (and/or block half 107B) may have optional holes or openings 150 that allow for water to pass through the block half 107A (and/or block half 107B).

Figure 1H:
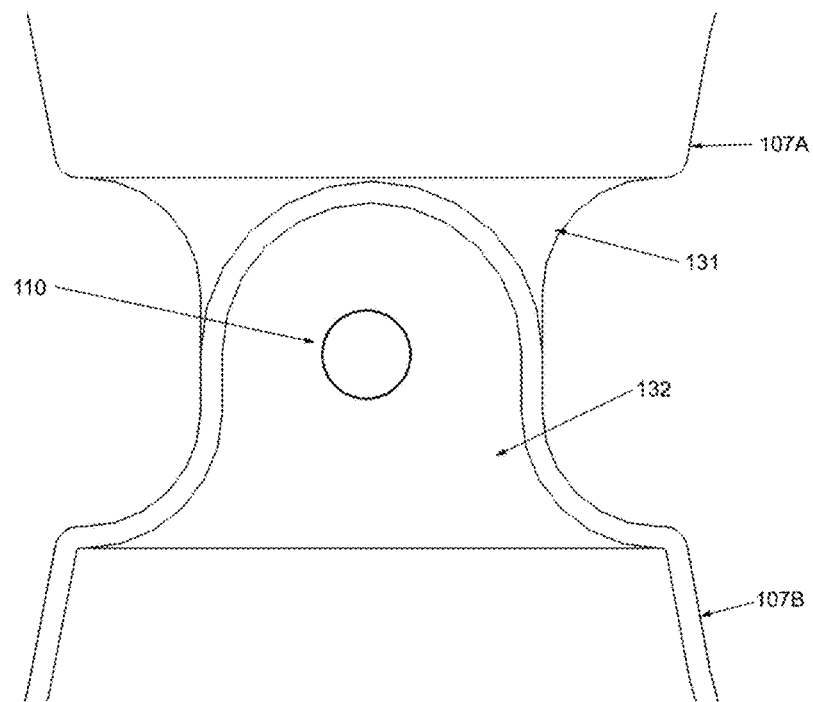
FIG. 1H is a top view of a hinged block.

Referring now to FIG. 1H, this FIGURE shows the top of block halves 107A and 107B and hinge location 110. Step 131 resides under step 132. In this case, block half 107B has an indentation at the top while block half 107A has an indentation underneath (and thus it is not shown). As noted previously, block halves 107A and 107B may have indentations consisting of any suitable pattern or may be solid. In either case, block halves 107A and 107B may be of any desired thickness, size, or shape.

Figure 1I:
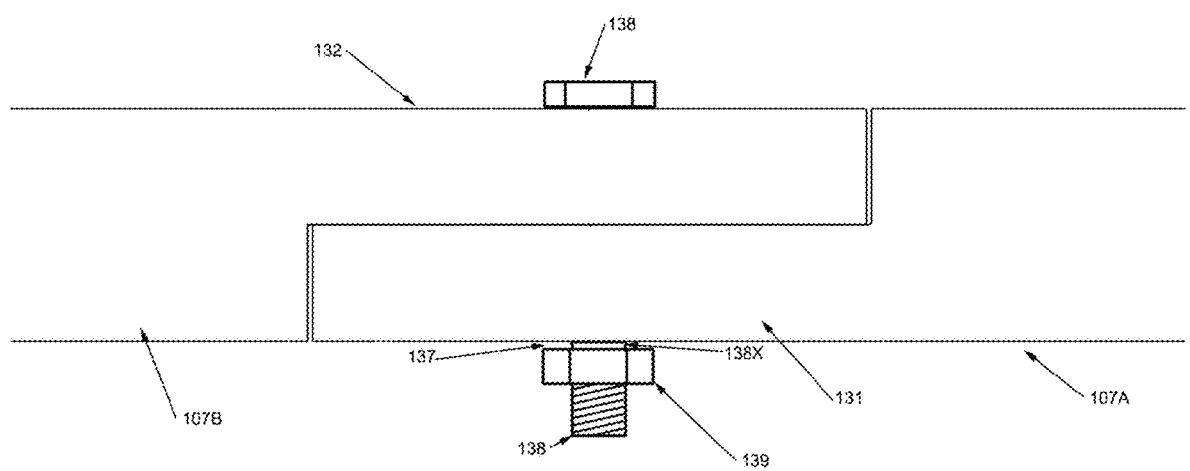
FIG. 1I is a side view of a hinged block with a hinge bolt shown.

Referring now to FIG. 1I, this FIGURE is a side view of block halves 107A and 107B with steps 131 and 132. Hinge bolt 138 passes through both block halves 107A and 107B at steps 131 and 132 to connect block halves 107A and 107B. Hinge bolt 138 is restrained by hinge nut 139. Gap 138X is created by leaving part of bolt 138 unthreaded.

Again referring to FIG. 1I, hinge bolt 138 and hinge nut 139 may be of any suitable size or shape. As noted previously, other hinge types may be used. Gap 138X may be of any suitable distance but will typically be minimal in order to retain some structural rigidity in the block connection while still allowing the block halves to rotate relative to each other, which allows the fairing to open.

The above aspects of this invention may be mixed and matched in any manner suitable to achieve the purposes of this invention. Springs may also be used with any of the fastening or coupling methods described herein. In particular, a spring may be used with the block hinge. While a U-shaped fairing is used as an example herein, the aspects of this invention may also apply to other VIV suppression devices such as fairings or other shape, helical strakes, and collars. Also, the VIV suppression device may fully cover the circumference of the underlying tubular or may only partially cover the circumference of the underlying tubular.

In broad embodiment, the present invention consists of a VIV suppression device that may be installed onto a tubular using a block hinge system. This device may be installed above the sea level or subsea and may be installed by hand (such as manually on a platform deck or by divers) or machine such as a remote operated vehicle or autonomous underwater vehicle.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. For several of the ideas presented herein, one or more of the parts may be optional. The invention should therefore not be limited by the above described embodiment, method and examples, but by all embodiments and methods within the scope and spirit of the invention.

What is claimed is:

1. A vortex-induced vibration (VIV) suppression device comprising:
   a fairing comprising a fairing body dimensioned to partially encircle an underlying tubular and a first arm and a second arm extending from the fairing body, wherein the fairing body comprises a first section and a second section that each have first ends that are interfacing one another to form a gap in between and a second end, and the first arm and the second arm are attached to the second end of a respective one of the first section and the second section such that they extend radially outward from the underlying tubular, and the first arm and the second arm are spaced a distance from one another along their entire length; and
   an interior block member to facilitate an opening or a closing of the fairing body around an underlying tubular, the interior block member having a first block section coupled to the first arm, a second block section coupled to the second arm and wherein the first block section and the second block section is movably coupled to the first block section.

2. The VIV suppression device of claim 1 wherein the distance between the first arm and the second arm decreases in a direction radially outward from the underlying tubular.

3. The VIV suppression device of claim 1 wherein the interior block member allows for ends of the first arm and the second arm to be moved toward one another to open the gap and away from one another to close the gap around the underlying tubular.

4. The VIV suppression device of claim 1 wherein the first block section and the second block section comprise outer ends that are coupled to the first arm and the second arm, respectively, and inner ends having interfacing recessed regions that are coupled to one another by a hinge.

5. The VIV suppression device of claim 1 wherein the first block section or the second block section comprises an opening to allow for water to flow through the first block section or the second block section.

6. The VIV suppression device of claim 1 wherein the interior block member is a first interior block member and the device further comprises a second interior block member coupled to the first arm and the second arm.

7. The VIV suppression device of claim 1 further comprising a nose member positioned along the gap to connect the first ends of the first section and the second section around the underlying tubular.

8. The VIV suppression device of claim 7 wherein the nose member comprises a fastener to connect the first section and the second section.

9. The VIV suppression device of claim 8 wherein at least one of the first ends comprises an alignment notch that facilitates alignment of the fastener of the nose member with a fastener opening formed in the first section or the second section.

10. The VIV suppression device of claim 1 further comprising a flange extending radially inward from the fairing body or the interior block member.

11. The VIV suppression device of claim 10 wherein the flange comprises a base portion that is attached to the fairing body or the interior block member and a lip portion that is perpendicular to the base portion.

12. The VIV suppression device of claim 1 wherein the first arm and the second arm are non-parallel to one another.

13. The VIV suppression device of claim 1 wherein the first arm and the second arm taper toward one another as they extend radially outward from the underlying tubular.

14. The VIV suppression device of claim 1 wherein the gap is a longitudinal opening extending along at least a portion of an axis of the fairing body, and wherein the opening is modifiable between an open configuration and a closed configuration.

15. The VIV suppression device of claim 1 further comprising a handle coupled to at least one of the first section or the second section near the gap.

16. A fairing comprising:
    a first section having a first body portion dimensioned to partially encircle an underlying tubular and a first arm portion extending radially outward from the first body portion;
    a second section having a second body portion dimensioned to partially encircle an underlying tubular and a second arm portion extending radially outward from the second body portion, and wherein a longitudinal opening is formed between an end of the first body portion and an end of the second body portion and the first arm and the second arm taper toward one another;
    a connecting member dimensioned to extend along the longitudinal opening and configured to connect the ends of the first body portion and the second body portion; and
    an interior block dimensioned to extend between the first arm and the second arm and configured to movably connect the first arm and the second arm.

17. The fairing of claim 16 wherein the first body portion and the second body portion have a curved shape that conforms to the shape of the underlying tubular, and the first arm and the second arm are straight.

18. The fairing of claim 16 wherein the first body portion and the first arm are integrally formed with one another as a single piece and the second body portion and the second arm are integrally formed with one another as a single piece.

19. The fairing of claim 16 wherein the connecting member comprises a width greater than the longitudinal opening so that the ends of the first body portion and the second body portion overlap the connecting member, and further comprises at least one fastener to connect the connecting member to at least one of the overlapping ends.

20. The fairing of claim 16 wherein the interior block is a first interior block comprising a hinge that allows the first arm and the second arm to move relative to one another, and the fairing further comprises a second interior block positioned between the first arm and the second arm at a position above or below the first interior block.

\* \* \* \* \*